United States Patent
Braverman et al.

(10) Patent No.: US 7,239,166 B2
(45) Date of Patent: Jul. 3, 2007

(54) PORTABLE MULTI-PURPOSE TOOLKIT FOR TESTING COMPUTING DEVICE HARDWARE AND SOFTWARE

(75) Inventors: Matthew I Braverman, Redmond, WA (US); Michael Kramer, Yonkers, NY (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/154,403

(22) Filed: Jun. 15, 2005

(65) Prior Publication Data

US 2006/0284632 A1 Dec. 21, 2006

(51) Int. Cl.
*G01R 31/26* (2006.01)
(52) U.S. Cl. ....................................... 324/765
(58) Field of Classification Search ...................... None
See application file for complete search history.

(56) References Cited

U.S. PATENT DOCUMENTS

| | | | | |
|---|---|---|---|---|
| 5,195,130 | A * | 3/1993 | Weiss et al. | 379/93.19 |
| 6,958,538 | B1 * | 10/2005 | Lauterbach et al. | 257/723 |
| 6,983,441 | B2 * | 1/2006 | Wescott | 716/17 |
| 7,170,121 | B1 * | 1/2007 | Lauterbach et al. | 257/288 |
| 2003/0023900 | A1 * | 1/2003 | Smith et al. | 714/25 |
| 2003/0056107 | A1 * | 3/2003 | Cammack et al. | 713/189 |
| 2003/0196103 | A1 * | 10/2003 | Edwards et al. | 713/200 |
| 2005/0144530 | A1 * | 6/2005 | Louden et al. | 714/38 |
| 2005/0176415 | A1 * | 8/2005 | Jang et al. | 455/418 |
| 2005/0188272 | A1 * | 8/2005 | Bodorin et al. | 714/38 |
| 2005/0229914 | A1 * | 10/2005 | Umahashi et al. | 125/13.01 |

* cited by examiner

*Primary Examiner*—Jermele Hollington
(74) *Attorney, Agent, or Firm*—Christensen O'Connor Johnson Kindness PLLC

(57) ABSTRACT

A testing device for determining the condition of hardware and/or software components of a computing (target) device is disclosed. The testing device includes a memory component, at least one connector and I/O software suitable for enabling the testing device to communicate with a target device as though the testing device is a peripheral component of the target device. Preferably, the connector is a USB connector. Also, preferably, the memory component includes an unwritable section and a protected section as well as a writable section.

17 Claims, 8 Drawing Sheets

PORTABLE MULTI-PURPOSE TOOLKIT FOR TESTING COMPUTING DEVICE HARDWARE AND SOFTWARE

FIELD OF THE INVENTION

The present invention relates to testing computing device software and hardware.

BACKGROUND OF THE INVENTION

Devices used for testing and repairing computing device hardware and software are frequently referred to herein as a "testing device" and the computing device being tested and repaired (if necessary), which is suspected of being dysfunctional, is frequently referred to as a "target device." While there are many devices for testing and repairing electrical wiring, telephones, telephone cables, television set top boxes, video cables, and the like, in the past, test and repair devices for dysfunctional computing (target) devices have often been the dysfunctional target device itself, or a computing device similar to the dysfunctional target device, running a test program. Instead of the compact, portable tools and toolsets common in other industries, computer repair personnel must usually put together an ad hoc toolkit by gathering whatever cables and connectors they can find and collecting a suite of software tools stored on a removable volume, for example, a compact disc (CD). If the target device, i.e., the dysfunctional computing device, is able to be run, the CD is inserted into the compact disc drive of the target device and/or the target device is connected to an external compact disc drive. If the target device is not able to run, another computing device is connected to the target device and the CD is inserted into the other computing device. Software corruption and damage to the components of the target device is detected by running tests stored on the CD, including scanning the memory of the target device.

In addition to the inconvenience and inconsistency of service inherent in the foregoing approach to testing and repairing computing (target) devices, there is a risk of corrupting the software running on the testing device. Software running on the testing device may be corrupted by malfunctioning software or hardware located on the target device. Hardware located on the target device may malfunction because it is damaged. Software running on the target device may malfunction because it has been accidentally corrupted or because it has been purposely corrupted by malware. Malware is software written and/or distributed with malicious intent to do damage to data and/or software. Examples of malware include, but are not limited to, computer viruses, worms, and Trojan horses. In more extreme cases of malfunctioning hardware components, the target device often does not function well enough to allow testing and scanning to be done. Obviously, if the target device cannot be started, the target device cannot be used as its own testing device and cannot communicate with an external testing device. It does not matter if one hardware component is malfunctioning or if many hardware components are malfunctioning. If there is no way to start the target device, there is no way to determine which hardware components are malfunctioning.

Thus, there exists a need for a testing device for testing the software and hardware of potentially dysfunctional computing devices. Preferably, the testing device should be capable of testing and possibly repairing or replacing the software of a computing (target) device while isolating itself from malware that may be present on the target device. Also, preferably, the testing device should be compact and portable. The present invention is directed to providing such a testing device.

SUMMARY OF THE INVENTION

In accordance with the present invention, a testing device for determining the condition of the hardware and/or software components of a computing (target) device is provided. The testing device includes a memory component and at least one connector and I/O software enabling the testing device to communicate with the target device as though the testing device is a peripheral component of the target device.

In accordance with other aspects of this invention, the memory component stores software suitable for use in testing a target device that replicates basic parts of the software stored on the target device, such as boot-up, basic I/O, base applications, and system software, for example. Preferably the basic parts, along with a basic toolset are stored in an unwritable section of the memory component, i.e., an area of the memory component that cannot be written over.

In accordance with further aspects of the invention, the memory component may also store other software, such as, a working operating system, a more complete toolset, default values, malware signatures, etc. Preferably, the other software is stored in a protected portion of the memory component, i.e., a section of the memory component that is protected from malware and other forms of memory destruction, but can be written over as updates occur and/or come into existence, i.e., new malware signatures, updated operating systems, new default values, new software and hardware test tools, etc.

In accordance with yet further aspects of this invention, the memory component may include a writable section wherein results of testing, including memory scanning, suspected memory and signature information, etc., can be stored for subsequent analysis.

In accordance with yet other aspects of this invention, preferably, the connector is a universal serial bus (USB) connector suitable for connecting to the USB port of the target device. Alternatively, the connector may be a series of connectors suitable for connecting to internal (or external) connectors of the target device.

In accordance with yet still other aspects of this invention, a testing device formed in accordance with this invention may include a user interface. Depending on implementation, the user interface may include keys for receiving tester input and an associated display or simply a start test switch and a light display having lights that denote that automatic testing is occurring and the positive or negative results of the test.

In accordance with another aspect of this invention, the testing device can contain one or more processing components such as CPU chips. This inclusion allows the testing device to provide intelligent on-board processing as a complement to the processing performed by the computer device which the testing device is testing.

In accordance with another aspect of this invention, the testing device can contain an integrated display unit and/or an input/output component such as a keyboard or a mouse. These inclusions allow the testing device to present to the user an independent display and/or a user to enter information and instructions.

As will be readily appreciated from the foregoing description, the present invention provides a testing device for determining the condition of hardware and/or software components in a computing (target) device. Depending on implementation, the testing device may include software for repairing or replacing dysfunctional software components of the computing device.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

As will be more readily appreciated from the following description, the present invention provides a testing device for determining the condition of the hardware and/or software components of a computing (target) device. The testing device includes both secured, i.e., protected and unsecured memory. Preferably, the protected memory is immune from the effects of any malware present in the target device. Preferably, the testing device is compact, lightweight, and portable. Depending on implementation, the testing device may include software for repairing or replacing software components in a computing device.

Figure 1:
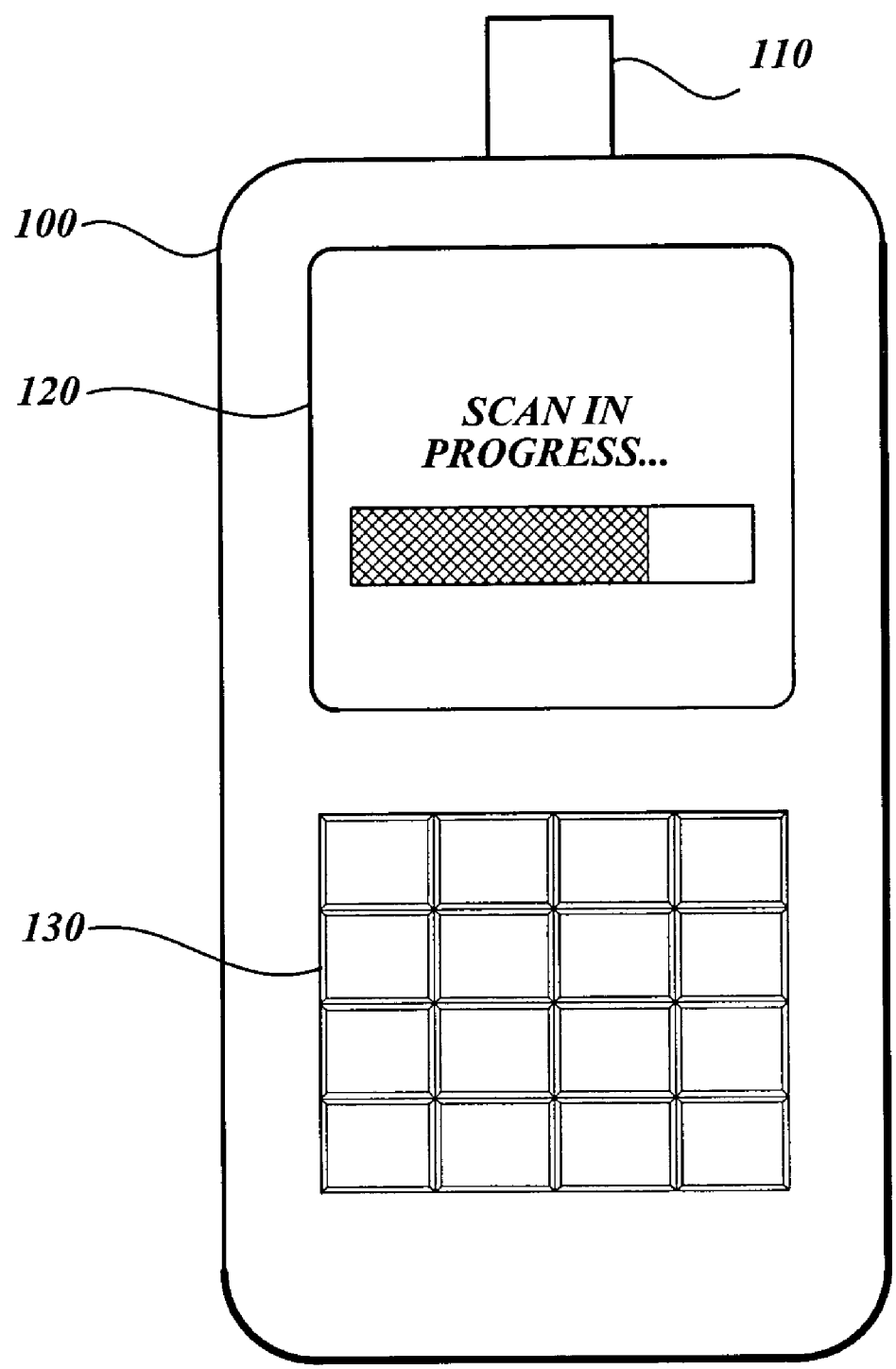
FIG. 1 is a pictorial diagram of an exemplary multi-purpose toolkit formed in accordance with the invention that includes a USB connector, a display, a keypad and memory component, portions of which are protected and portions of which are unprotected.
Figure 1A:
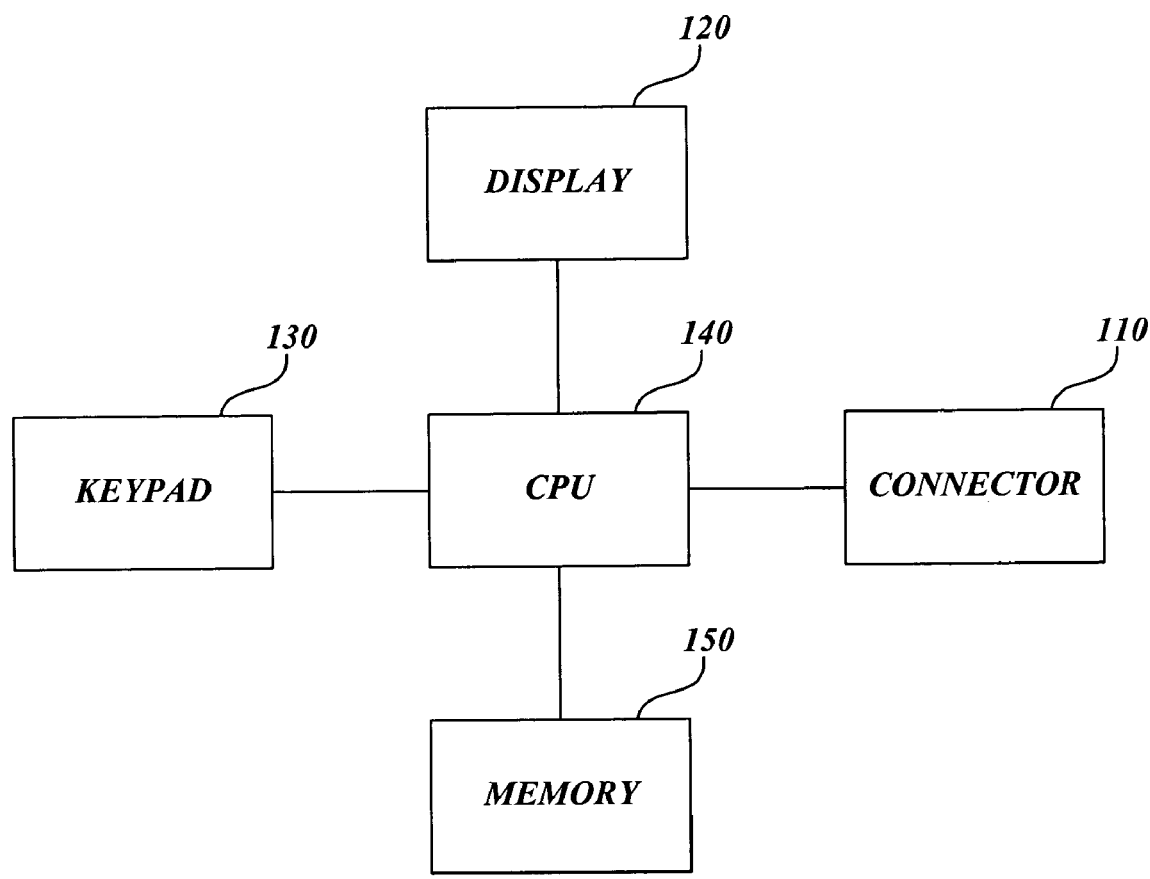
FIG. 1A is a block diagram of the major elements of the exemplary multi-purpose toolkit illustrated in FIG. 1.

FIG. 1 is a pictorial diagram of an exemplary testing device, herein also referred to as a multi-purpose toolkit 100, formed in accordance with the invention that includes a universal serial bus (USB) connector 110, a display 120, and a keypad 130, and memory (not shown in FIG. 1). FIG. 1A is a block diagram of the major components of the multi-purpose toolkit 100 illustrated in FIG. 1. In addition to the USB connector 110, the display 120, and the keypad 130, the block diagram shown in FIG. 1A includes a central processing unit (CPU) 140 and memory 150. Various essential, but not major components, such as input/output (I/O) components are not separately illustrated. Such components may be separate or form part of one of the illustrated major components. Further, some embodiments of the invention may not include a separate CPU, relying on the CPU of the target device to perform the herein described functions.

The USB connector 110 conforms to the USB port specification. The USB port specification specifies a serial bus. Those skilled in the art will appreciate that a bus is a set of communication lines that connect components of a computer system. A USB port is a serial bus port for connecting peripherals to a computing device, such as, but not limited to, external compact disc (CD) drives, printers, modems, mice, and keyboards through a single, general-purpose port. USB conforming technology enables computing devices to automatically detect a peripheral device and configure the necessary software, i.e. device driver(s). A USB compliant computing device may also distribute electrical power to USB peripheral devices. The USB connector 110 on the multi-purpose toolkit 100 allows the multi-purpose toolkit 100 to plug directly into a target computer via the USB port on the target computer. When the multi-purpose toolkit 100 is plugged into the USB port of a target device, the multi-purpose toolkit, i.e., the testing device, appears to the target (computing) device as a USB device, for example, a printer or a mouse. Appearing as a USB device to the target device allows the multi-purpose toolkit 100 to use the USB driver software of the target device to communicate with the software of the target device. Communicating with the software of the target device allows the multi-purpose toolkit 100 to gather information about the condition of the hardware and software components of the target device.

As will be readily appreciated by those skilled in the art and others, when the multi-purpose toolkit 100 is recognized by the target device, it may be recognized as a display device, a memory device and an input device. Typically, drivers for these functions need to be automatically loaded into the memory of the target device in order for the multi-purpose toolkit 100 to be recognized as a display device, a memory device and an input device. Depending on implementation, drivers for these functions may be preloaded into (i.e., included in) the operating system of the target device. Alternatively, these drivers can be automatically loaded when the multi-purpose toolkit 100 is plugged into the target device.

Figure 2:
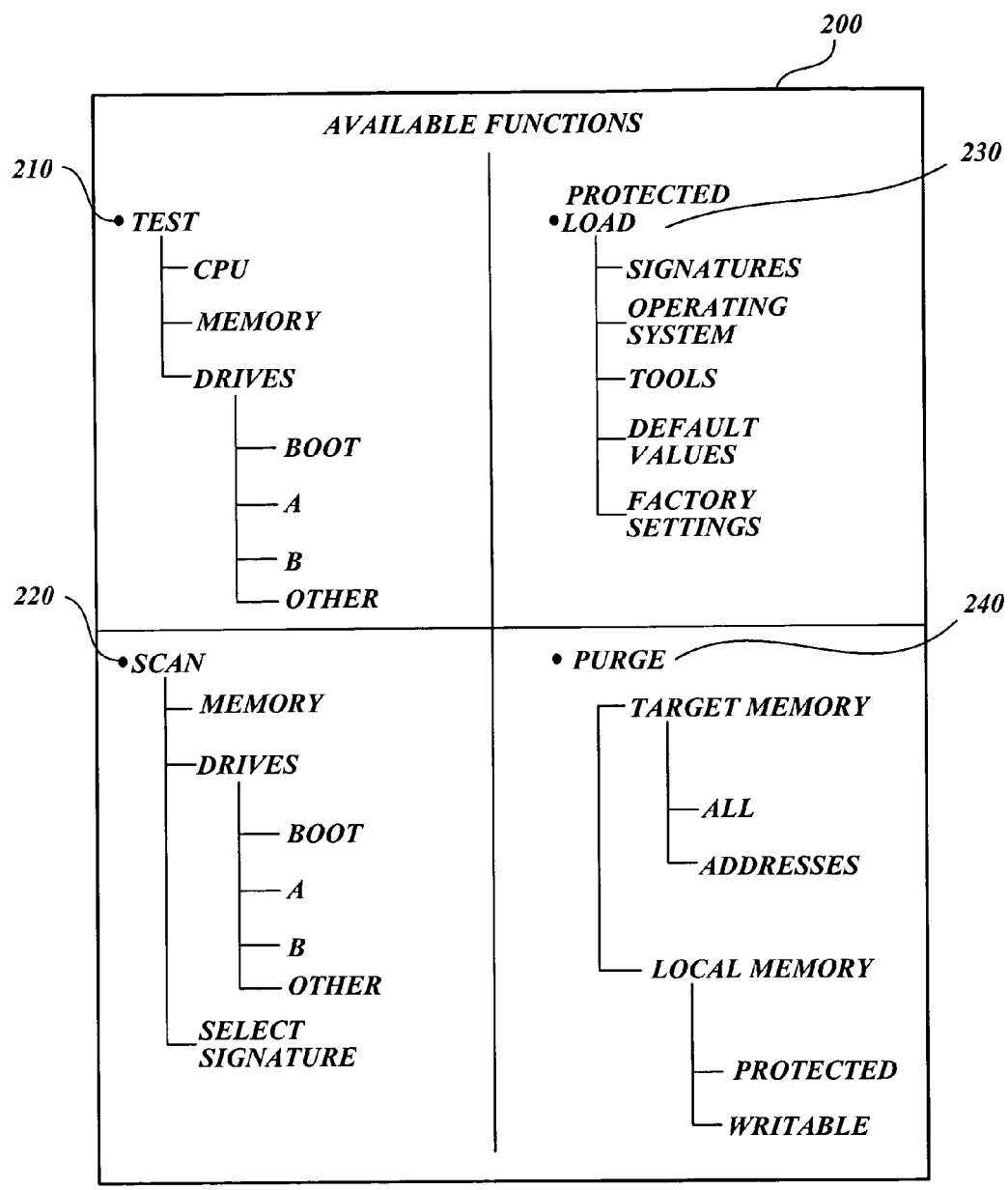
FIG. 2 is an exemplary tree diagram of the graphical user interface functions that may appear on the display of the exemplary multi-purpose toolkit illustrated in FIG. 1.

Depending on implementation, while connected to the target device as a USB device, the multi-purpose toolkit 100 may display various functions available for testing the target device, including scanning the memory of the target device for malware or other software problems. FIG. 2 is an exemplary tree diagram 200 of the functions that may be available in embodiments of the invention and that may be presented in a graphical user interface (GUI), for example, a GUI presented on the display 120 of the multi-purpose toolkit 100. Depending on implementation, functions of the tree diagram 200 shown in FIG. 2 may or may not be available. Further, not all of the functions in the tree diagram 200 may be presented on the display 120 at the same time. Depending on implementation, the various illustrated functions may be displayed on different "pages" with or without additional material, such as instructions, from that shown in FIG. 2.

The functions 200 pictured in FIG. 2, that may appear on the display 120 of the device 100 pictured in FIG. 1, are divided into four groups. The function groups shown in FIG. 2 are test 210, scan 220, protected load 230, and purge 240. The functions available in the test group 210 include, but are not limited to, tests of the target device CPU, memory, and drives, i.e., disc drives. The CPU test function enables the testing device to test the CPU of the target device. The memory test function enables the testing device to test the memory of the target device. The drives test function enables the testing device to select and test various disc drives on the target device. The disc drives accessible to the drive test function include, but are not limited to, the boot drive, drive A, drive B, and other drives.

The functions available in the scan group 220 include, but are not limited to, memory scans, drive scans, and select signature. The memory scan function enables the testing device to scan the contents of the memory of the target device. The drive scan function enables the testing device to scan the contents of the disc drives of the target device. The disc drives accessible to the drive scan function include, but are not limited to, the boot drive, drive A, drive B, and other drives. The select signature function of the scan functions enables the test device to scan for a particular signature, i.e., a unique data pattern that identifies a deleterious software item such as a virus.

The functions available in the protected load group 230 enable the test device to load various software modules into the test device's protected memory. The software modules may then be used by the test device to aid in testing and scanning the target device. The types of software modules which may be loaded into the test device's protected memory include, but are not limited to, signatures, operating system, tools, default values, and factory settings.

The functions available in the purge group 240 enable the test device to purge memory in the test device or in the target device. Memory in the target device that may be purged includes, but is not limited to, all of the memory of the target device or areas of memory specified by one or more memory address ranges. Memory in the test device, i.e., local memory, that may be purged includes protected and writable memory.

As noted above, not all of the functions pictured in FIG. 2 or all of the function groups pictured in FIG. 2 may be included in a testing device formed in accordance with this invention. Some embodiments of the invention may not be designed to support all of the depicted functions. For example, the "protected load" 230 and "purge" 240 groups of functions may not be included in the multi-purpose toolkit 100, pictured in FIG. 1. Other embodiments of the invention may include functions in addition to the functions shown in FIG. 2. Whether or not a function or group of functions is made available in an embodiment of the invention depends on the connectors on the testing and target devices and the hardware and software on the devices. The availability of various functions also depends on the test and data stored in the memory of the testing device.

Figure 3:
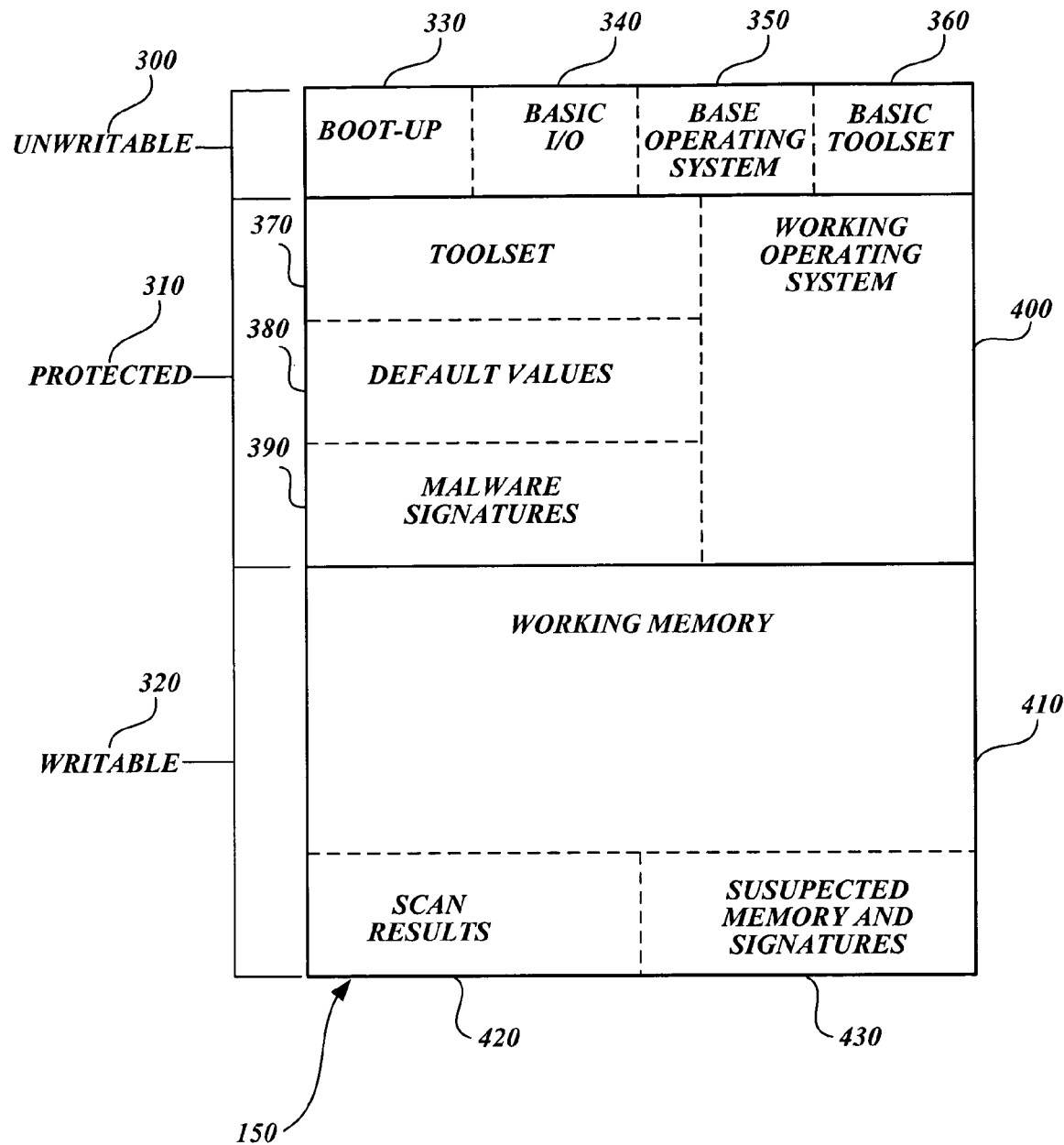
FIG. 3 is a block diagram of an exemplary memory map suitable for use in the exemplary multi-purpose toolkit illustrated in FIG. 1.

FIG. 3 is a block diagram of an exemplary map of various sections of memory suitable for inclusion in the memory 150 of the exemplary toolkit illustrated in FIGS. 1 and 1A. As shown in FIG. 3, the memory 150 is illustrated as divided into three sections: an unwritable section 300, a protected section 310, and a writable section 320. The unwritable section 300 contains memory that the testing device can read but cannot write to. The protected section 310 contains memory that the testing device can read and may, under certain conditions, write to. The writable section 320 contains memory that the testing device may read and write to without restriction. While shown as contiguous in FIG. 3, preferably, the three memory sections are formed of different components, examples of which are described below.

The unwritable section 300 of memory is illustrated as divided into four software areas: a boot-up area 330, basic I/O area 340, base operating system area 350, and basic toolset area 360. The protected section 310 of memory is illustrated as divided into four software areas: a toolset area 370, a default values area 380, a malware signatures area 390, and a working operating system area 400. The writable section 320 of memory is illustrated as divided into three software areas: a working memory area 410, a scan results area 420, and a suspected memory and signatures area 430.

The boot-up area 330 of memory is used to store the software necessary to boot-up, or start, a testing device, i.e., a specific embodiment of the invention. The basic I/O stores software suitable for allowing the testing device to perform basic input and output functions, including interfacing with the USB connector 110 and user interface components, i.e., a display 120 and a keyboard 130. The base operating system area 350 stores a basic operating system suitable for running a target device after the target is booted. The basic toolset area 360 stores software suitable for performing basic scanning and testing of a target device. The basic toolset area 360 may also include a list of malware signatures.

The toolset area 370 of memory stores a larger and more varied toolset than the basic toolset area 360. The default values area 380 of memory stores values that may be used by the toolsets to determine certain problems or to run certain tests. The malware signatures area 390 of memory stores the signatures of various kinds of malware. In this regard, as well known to those skilled in the art, malware has certain characteristics that create a memory signature called a malware signature.

The working operating system area 400 of memory stores a working operating system that is more comprehensive than the operating system software stored in the base operating system area 350.

The working memory area 410 is a writable area of memory that is used by the testing device during scanning and testing a target device to store temporary and/or transitional data generated during a test. The scan results area 420 is used to store the results of scans run on the target device. If software testing and/or scanning detects suspected memory that contains possible malware, the signatures of the malware may be copied into the suspected memory and signatures area 430 of memory.

The unwritable and protected sections 300 and 310 of the memory shown in FIG. 3 may be implemented by flash memory. Flash memory can be set to be protected and unwritable depending on design. Alternatively, the unwritable section 300 of memory may be implemented as a combination of read-only memory (ROM), programmable read-only memory (PROM), and/or electrically erasable programmable read-only memory (EEPROM) devices. The writable area of memory 320 may be implemented as random access memory (RAM) and/or dynamic random access memory (DRAM). These implementations should be construed as exemplary and not as limiting upon embodiments of the present invention.

As noted by its title, the unwritable section 300 of memory cannot be written to and, thus, is fully protected from malware. In contrast, the protected section 310 of memory can be written to, but only by trusted sources. The unwritable section 300 contains the minimum required to boot-up and operate a test device. The protected area 310 may contain an updateable operating system, more extensive and updated tools, and the latest malware signatures. While the working operating system 350 is intended to remotely run the target device, embodiments of the invention may be designed to allow a copy of an operating system to be loaded onto the target (computing) device.

Figure 4:
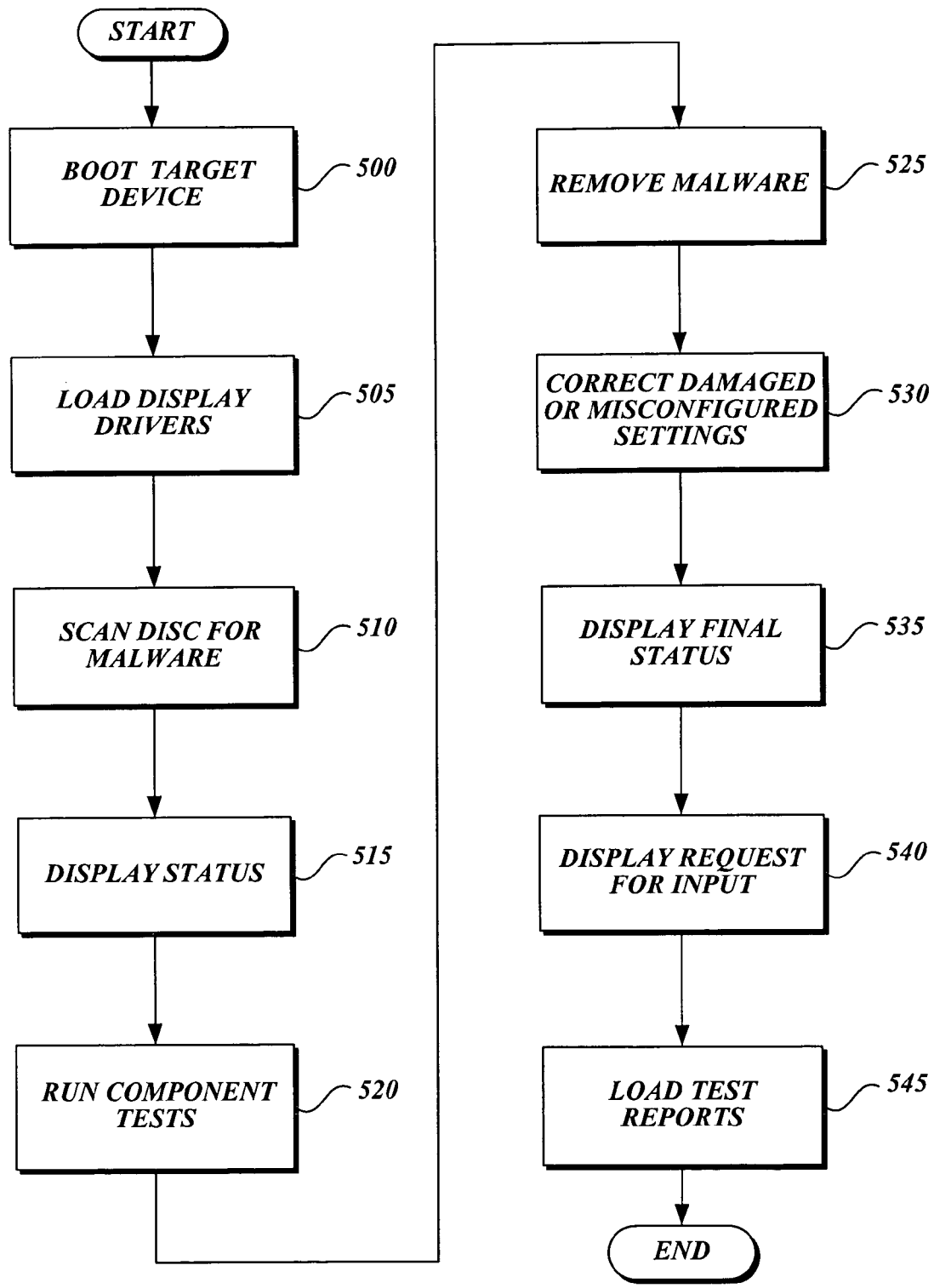
FIG. 4 is a flow diagram of an exemplary software program suitable for controlling the scanning and testing functions of the exemplary multi-purpose toolkit illustrated in FIG. 1.

FIG. 4 is a flow diagram of an exemplary software program suitable for controlling the scanning and testing functions of the exemplary multi-purpose toolkit illustrated in FIGS. 1-3 and described above. The software program illustrated in FIG. 4 may be stored in the basic toolset 360 or toolset 370 memory areas shown in FIG. 3. Depending on the implementation, the software program illustrated in FIG. 4, or required parts of the software program, may be executed by the computing resources of either the multi-purpose toolkit or the target device. Preferably, the software program illustrated in FIG. 4 is loaded into the memory of the target device and executed by computing resources on the target device. Alternatively, the software program may be executed by the CPU of the software toolkit 100, if, as shown in FIG. 1A, the software toolkit includes a CPU. Or, the software toolkit CPU may be included, but only function if the CPU of the target device is inoperable or unavailable.

At block 500 of FIG. 4, if the target device is not completely booted, or if the target device needs to be rebooted, the software program executes a subroutine that boots the target device. As well known to those skilled in the art, execution of a boot program transfers control to an operating system. The operating system may be the operating system of the target device. If the operating system of the target device is damaged or inaccessible, the operating system used may be the base operating system 350 or the working operating system 400. The operating system uses software in the basic I/O area 340 of memory 150 to communicate with the test device to which the multi-purpose toolkit is connected. At block 505, display drivers, which may be stored in either the basic toolset area 360 or the toolset area 370 of memory 150, are loaded onto the target device. If the operating system of the target device is undamaged and accessible and contains the necessary display drivers, it is not necessary to load the display drivers. The target device uses the display drivers to display information on the display 120 of the multi-purpose toolkit. At block 510, software modules from the basic toolset area 360 or the toolset area 370 that enable the software program to scan discs for malware are loaded onto the target device. In a conventional manner, the software modules cause the target device to scan the discs of the target device to locate and identify instances of malware. For example, malware instances may be identified by comparing data patterns stored on a disc to known malware signatures 390 stored in the multi-purpose tool kit. If a data pattern in an area of a disc matches a malware signature, the software program stores the type and location of the malware in the scan results area 420 of the multi-purpose toolkit 100. Preferably, corrective action, e.g., removing malware instances and repairing malware damage, is not performed until the disc scan and perhaps additional functions, e.g., component tests, are completed. This delay is desirable in order to prevent redundant or conflicting corrective actions, e.g., repairing a disc block that is later loaded with new software. After the disc scan is started, at block 515, the software program causes the multi-purpose toolkit 100 to display a status message, e.g., "scan in progress." At block 520, software modules stored in either the basic toolset area 360 or the toolset area 370 that enable the software program to test components of the target device such as memory, input and output devices, and the like, are loaded onto the target device. Using the aforementioned software modules, the software program tests components on the target device to identify irregularities such as, but not limited to, damaged or misconfigured setting values used by the operating system. At block 525, malware instances located and identified at block 510 are removed. At block 530, damaged and misconfigured software settings found at block 520 are restored to correct values. At block 535, the status of the disc and other tested components is shown on the display. At block 540, an optional user prompt message may be displayed, e.g., "Would you like to run more tests?". At block 545, reports of the tests are loaded into the writeable memory area 320 of the multi-purpose toolkit. Signatures of suspected but unidentifiable malware are written to the suspected memory and signatures memory area 430.

Figure 5:
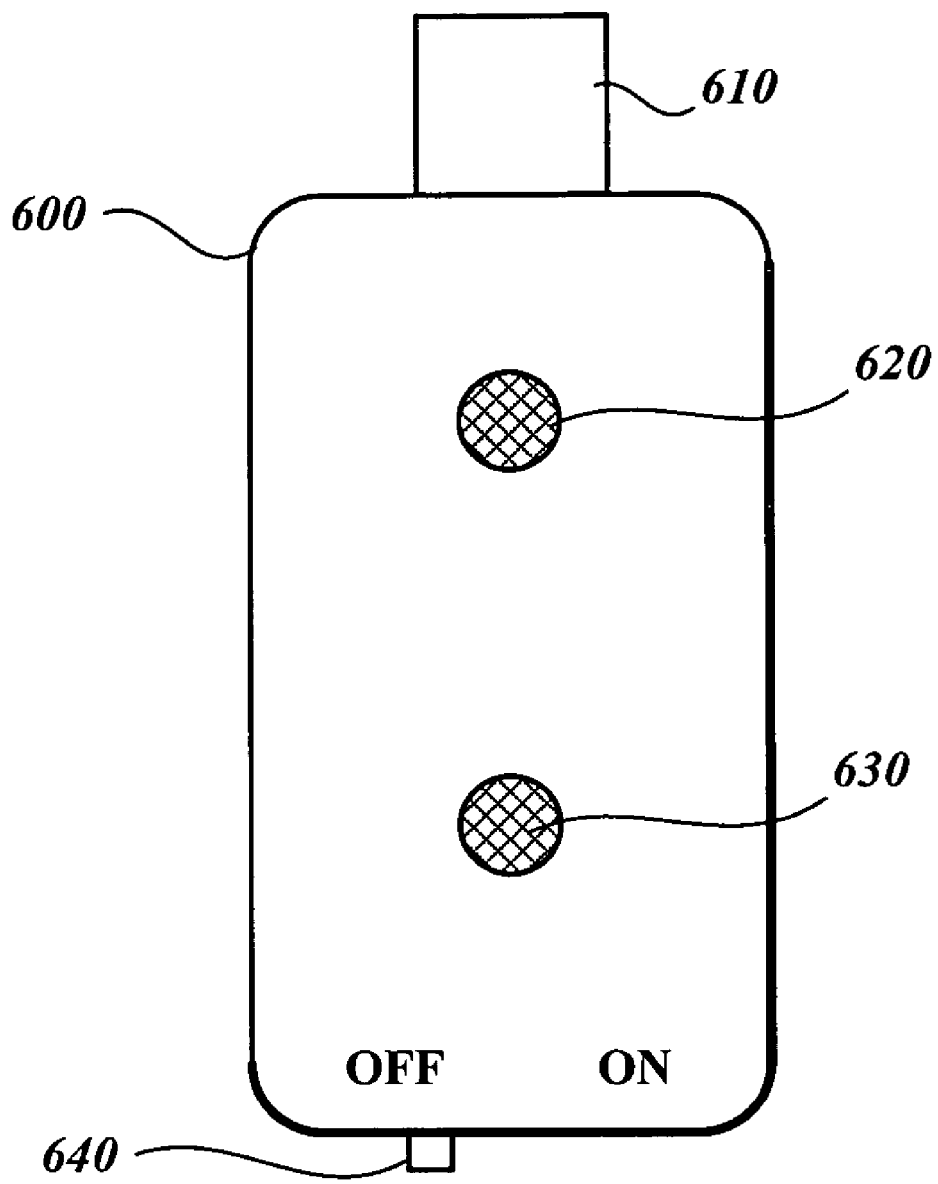
FIG. 5 is a pictorial diagram of another exemplary (low complexity) multi-purpose toolkit formed in accordance with the invention.

FIG. 5 is a pictorial diagram of another exemplary (low complexity) multi-purpose toolkit 600 formed in accordance with the invention. Rather than including a keyboard and a display, as in FIG. 1, the multi-purpose toolkit 600 illustrated in FIG. 5, in addition to a USB connector 610, includes a green indicator LED 620, a red indicator LED 630, and an on/off switch 640. The multi-purpose toolkit 600 illustrated in FIG. 5 is intended to be fully automatic and used by those with little or no computer repair skills. The multi-purpose toolkit 600 is pluggable into the USB port of the target device. After being attached, the on/off switch 640 is switched to the ON position. When this occurs, a predetermined set of tests are automatically run on the target device. For example, some or all of the tests shown in the test area 210 of FIG. 2 may be run. If the tests are successful, the green LED 620 is lit. If the tests are not completely successful, the red LED 630 is lit. If desired, during testing, rather than displaying a scan in progress bar as shown in FIG. 1, one or both of the LEDs 620 and/or 630 may flash or emit a yellow or other color to indicate that a test is in process. After the tests are run and the results gathered, the testing device may be turned off using the on/off switch 640. The results of the tests or scans (particularly unsuccessful results) may be stored in a writable area of memory for subsequent analysis. The test device 600 pictured in FIG. 5 may then be plugged into another computer that downloads the stored results for analysis and provides a test result support to a user. In this way, for example, the multi-purpose toolkit 600 can detect a virus infecting the target computer and report the damage caused by the virus without being permanently damaged by the virus, because the unwritable memory section of the multi-purpose toolkit 600 cannot be infected by the virus.

One example of the function described above is to have the target device recognize the USB device as a disc drive when the target device is turned on, and to autorun a specific application located on the USB device as one of the files stored on the USB device. This is conceptually similar to autostarting an installation program when a CD is loaded into a drive.

The exemplary embodiment of the invention in FIG. 5 may not include all of the functions illustrated in FIG. 2. For example, the device pictured in FIG. 5 may include the test functions 210, but not the scan functions 220, or the protected load functions 230, or the purge functions 240. Also, the exemplary embodiment of the invention pictured in FIG. 5 may not have all the areas of memory included in the memory map shown in FIG. 3. For example, the testing device shown in FIG. 5 may only include the unwritable 300 section comprising the boot-up area 330, basic I/O area 340, base operating system area 350, and basic toolset area 360. In addition, the memory of the testing device pictured in FIG. 5 may only include a writable memory section 320 and no protected memory section 310.

Figure 6:
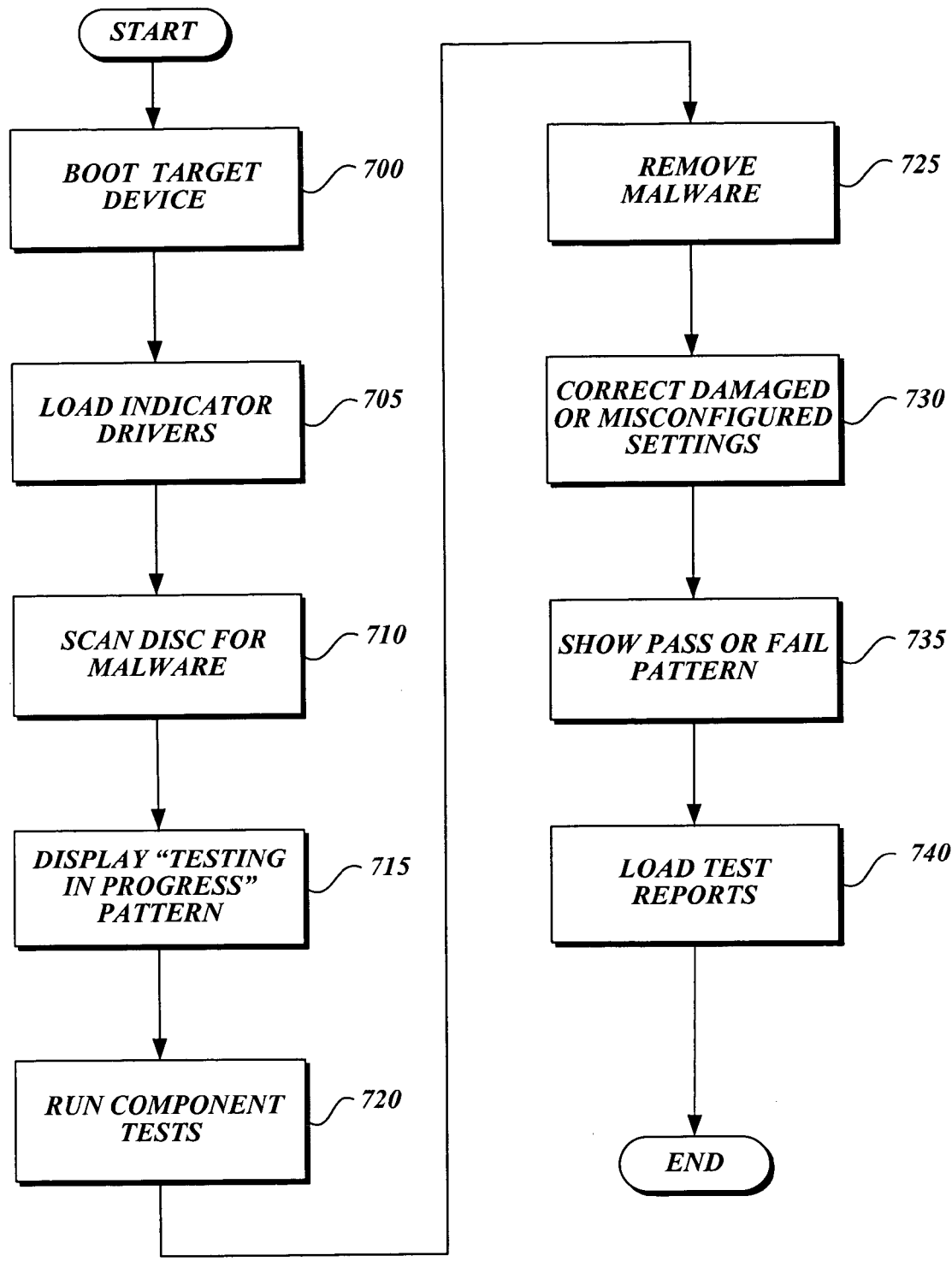
FIG. 6 is a flow diagram of an exemplary software program suitable for controlling the scanning and testing functions of the exemplary low complexity multi-purpose toolkit illustrated in FIG. 5.

FIG. 6 is a flow diagram of an exemplary software program suitable for controlling the scanning and testing functions, of the exemplary low complexity multi-purpose toolkit illustrated in FIG. 5 and described above. With a few exceptions described below, the software program illustrated in FIG. 6 is similar to the software program illustrated in FIG. 4 and described above.

In FIG. 6, at block 700, the software program executes to boot the target device, if necessary. At block 705, indicator drivers, which may be contained in either the basic toolset area 360 or the toolset area 370, are loaded onto the target device. The target device uses the indicator drivers to control the indicators of the multi-purpose toolkit 600, e.g., the green LED 620 and the red LED 630. At block 710, software modules included in either the basic toolset area 360 or the toolset area 370 that enable the software program to scan the discs of the target device for malware are loaded onto the target device. The scanning process is similar to the process described above with respect to block 510 of FIG. 4. After the disc scan is started, at block 715, the software program causes one or both of the indicators to indicate testing is in progress. For example, the color of one or both of the indicators may change to yellow, or one or both of the indicators may flash. At block 720, as with the process described with respect to block 520 of FIG. 4, the components of the target device are tested. At block 725, malware instances are removed. At block 730, damaged and misconfigured software settings are restored to correct values. At block 735, the green LED 620 is lit to indicate a successful test or the red LED 630 is lit to indicate an unsuccessful test. At block 740, the results of the tests are loaded into the writeable memory area 320 of the multi-purpose toolkit.

Figure 7:
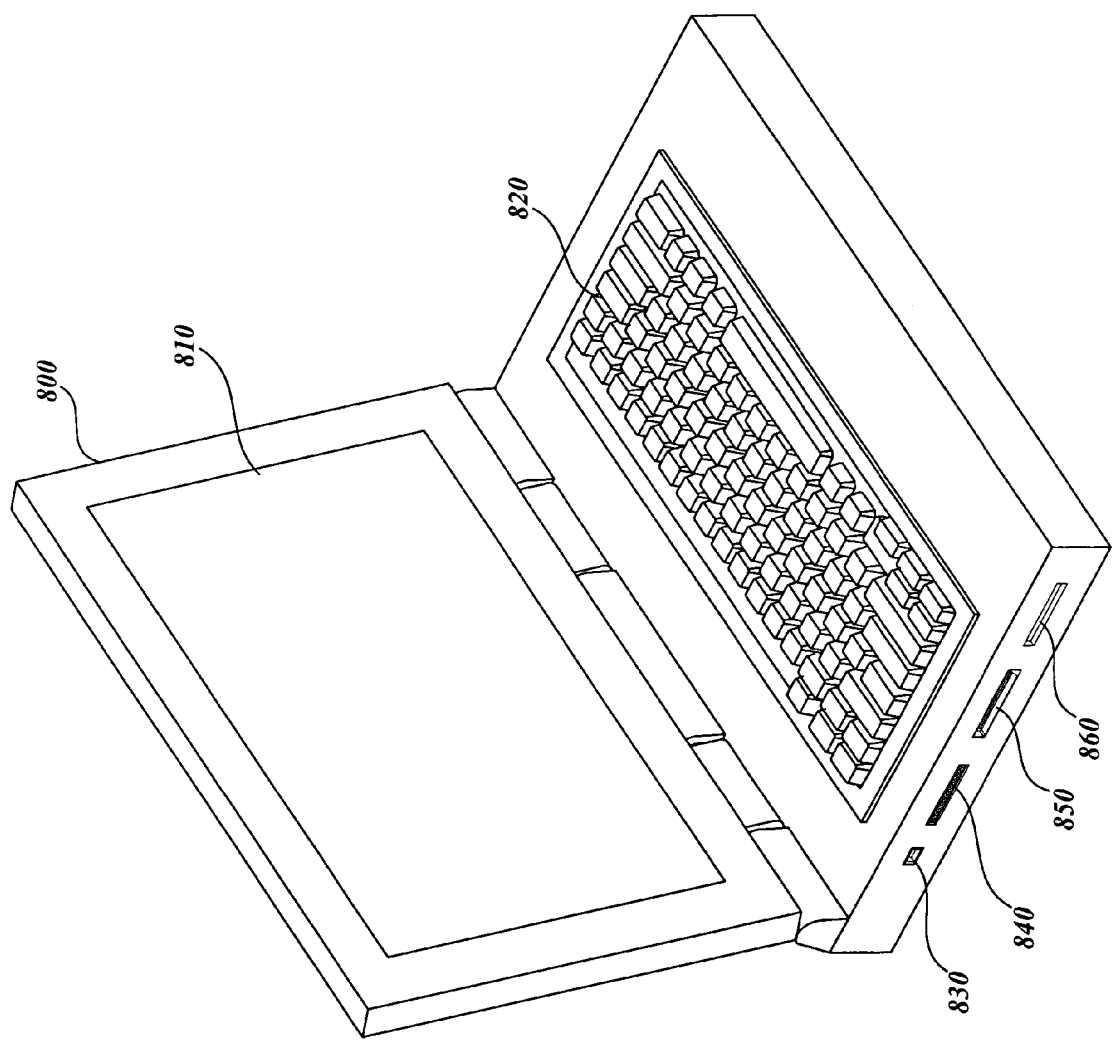
FIG. 7 is a pictorial diagram of yet another exemplary (high complexity) multi-purpose toolkit formed in accordance with the invention.

FIG. 7 is a pictorial diagram of yet another exemplary (high complexity) multi-purpose toolkit 800 formed in accordance with the invention. The multi-purpose toolkit 800 illustrated in FIG. 7 resembles a portable or laptop computer in that the multi-purpose toolkit 800 includes a relatively large display 810 located on the inside of a cover, and a computer keyboard 820, memory and a hard disc drive similar to that of a laptop computer contained in the body of multi-purpose toolkit 800. In addition to a USB connector with retractable cable 830, the multi-purpose toolkit 800 has connectors and retractable cables 840, 850, and 860 for connecting directly the disc drives and memory boards of target (computing) devices. One connector and retractable cable 840 enables the multi-purpose toolkit 800 to be connected to disc drives with an integrated drive electronics (IDE) connector, for example. The IDE specification specifies an interface for mass storage devices in which the controller is integrated into the disc drive. Another connector and retractable cable 850 enables the multi-purpose toolkit 800 to be connected to disc drives with a small computer systems interface (SCSI). The SCSI specification specifies an interface for parallel input and output often used on disc drives. A further connector and retractable cable 860 enables the multi-purpose toolkit 800 to be connected to the memory connector of a target device (computer). The connectors and retractable cables described above are exemplary and should not be construed as limiting upon the present invention.

Preferably, the multi-purpose toolkit 800 contains at least all of the functions shown in FIG. 2 and a memory that contains at least all of the memory map areas shown in FIG. 3. Since the exemplary multi-purpose toolkit 800 shown in FIG. 7 is essentially a full computer or computing device, extensive tests and scans can be run and large amounts of information about target devices can be collected and stored. If desired, a section of memory of the target device can be selected and purged using the purge 240 function shown in FIG. 2.

As will be readily appreciated from the foregoing disclosure, depending on implementation, programs in embodiments of the invention may require updates. For instance, if one of the diagnostic and repair programs in an embodiment of the invention is an anti-malware or anti-virus application, the application may need to be updated with the latest application code and/or malware signature set. Such embodiments of the invention are preferably, connectable to a computer capable accessing and delivering such an update, i.e., an update-capable computer. The update-capable computer may download a new set of applications and/or signature files to the embodiment of the invention. Care must be taken to validate the integrity and the authenticity of such programs before installing the programs on embodiments of the invention. Those skilled in the art will appreciate that digital signatures and signed hash functions can be used to validate the authenticity and integrity of files before such files are stored on an embodiment of the invention. Alternatively, embodiments of the invention can be designed so as to be updated by substituting updated memory chips, i.e., replacing an earlier memory chip with a later or updated memory chip.

As will be readily appreciated by those skilled in the art and others for the foregoing description of exemplary embodiments of the invention, the invention can be implemented in various ways from relatively uncomplicated with relatively simple user interfaces (FIG. 5) to more complicated intermediate user interfaces (FIG. 1) to very complicated with full user interfaces (FIG. 7). Regardless of implementation, the invention provides multi-purpose toolkits suitable for determining the condition of the hardware and/or software components of target devices. Some embodiments provide for repairing or replacing software components while remaining safely isolated from the affects of malware that may be present on a target device. While the presently preferred embodiments of the invention have been illustrated and described, it will be appreciated that various changes can be made therein without departing from the spirit and scope of the invention, as defined by the appended claims.

The embodiments of the invention in which an exclusive property or privilege is claimed are defined as follows:

1. A malware resistant multi-purpose toolkit for testing the condition of both the hardware and the software components of a target device, comprising:
 (a) a connector suitable for connecting the multi-purpose toolkit to said target device; and
 (b) a memory component, said memory component including:
  (1) an unwritable section, said unwritable section storing software for controlling the operation of the target device, said memory component also storing;
   (i) a plurality of tools suitable for testing the condition of both the hardware and the software components of the target device; and
   (ii) I/O software for communication with the target device via the connector; and
  (2) a driver that, when loaded onto said target device, causes the results of tests of the condition of the hardware and/or software to be displayed on a display of the target device.

2. A multi-purpose toolkit claimed in claim 1 wherein said memory component also stores the results of tests of the condition of the hardware and/or software components of the target device.

3. The multi-purpose toolkit claimed in claim 1, wherein the unwritable section also includes one or more of (i) a boot-up area storing software suitable for starting the target device; (ii) said I/O software; and (iii) a basic toolset.

4. The multi-purpose toolkit claimed in claim 3, wherein said basic toolset area includes malware signatures.

5. The multi-purpose toolkit in claim 1, wherein the memory component also includes a writable section for storing the results of tests of the condition of the hardware and/or software components of the target device.

6. The multi-purpose toolkit claimed in claim 1 including a user interface.

7. The multi-purpose toolkit claimed in claim 6, wherein said user interface includes at least one LED display and a control switch.

8. The multi-purpose toolkit claimed in claim 6, wherein said user interface includes a display and user actuatable keys.

9. The multi-purpose toolkit claimed in claim 1, wherein the connector is a USB connector.

10. The multi-purpose toolkit claimed in claim 1, including a plurality of connectors suitable for connecting said multi-purpose toolkit to selected hardware components of said target device.

11. The multi-purpose toolkit claimed in claim 1, wherein the memory component stores instructions that when executed, enable the multi-purpose toolkit to:
    (a) control the operation of the target device; and
    (b) test the condition of the hardware and/or software components of the target device.

12. A malware resistant multi-purpose toolkit for testing the condition of both the hardware and the software components of a target device, comprising:
    (a) a connector suitable for connecting the multi-purpose toolkit to said target device; and
    (b) a memory component, said memory component including:
        (1) an unwritable section, said unwritable section storing software for controlling the operation of the target device, said memory component also storing:
            (i) a plurality of tools suitable for testing the condition of both the hardware and the software components of the target device; and
            (ii) I/O software for communication with the target device via the connector; and
        (2) a protected section only accessible by trusted sources, the protected section including one or more of:
            (i) a working operating system for storing software for controlling the operation of said target device;
            (ii) toolset area suitable for storing tools for testing the condition of both the hardware and the software components of the target device;
            (iii) a default values area suitable for storing default values usable by the tools stored in said toolset area; and
            (iv) a malware signature area suitable for storing malware signatures suitable for use by said tools stored in said toolset area.

13. A malware resistant test device containing computer readable media, at least a portion of which is unwritable, containing computer executable instructions suitable for testing the condition of both the hardware and the software components of a target device that when executed cause the malware resistant test device to:
    (a) boot the target device if the target device is not booted; and
    (b) test the operation of the hardware and software components of the target device by causing the target device to:
        (1) scan the disc drives of the target device to determine if malware is present on the disc drives; and
        (2) test the operation of the hardware and software components of the target device to determine if the hardware and/or software components are functioning correctly;
    wherein the computer executable instructions for causing the target device to boot if the target device is not booted are stored in the unwritable portion.

14. The malware resistant test device claimed in claim 13, wherein the computer executable instructions, when executed, also cause the test device to:
    (c) load display drivers onto the target device;
    (d) display the results of the tests of the operation of the hardware and/or software components.

15. A method of testing the hardware and/or software components of a target device employing a malware resistant tool that is separate and distinct from said target device comprising:
    loading display drivers onto said target device from said malware resistant tool;
    scanning the discs of said target device for malware;
    testing selected hardware and/or software components of said target device; and
    displaying the results of said scanning of the discs of said target device for malware and said testing of the hardware and/or software components of said target device.

16. The method of claim 15 including creating a scan in progress display while the scanning of the discs of said target device for malware.

17. The method of claim 15 including removing malware from the discs of said target device.

* * * * *